United States Patent Office 3,810,842
Patented May 14, 1974

3,810,842
COMPOSITION FOR DECONTAMINATING
CHEMICAL WARFARE AGENTS
Paul R. Steyermark, Silver Spring, Md., assignor to W. R. Grace & Co., New York, N.Y.
No Drawing. Filed Feb. 15, 1966, Ser. No. 529,174
Int. Cl. C11d 1/18
U.S. Cl. 252—153                    10 Claims This invention relates to a new composition of matter. More particularly, this invention relates to a new composition of matter suitable for use in the decontamination of surfaces and materials that have been contaminated with persistent chemical warfare agents and the like.

In summary, this invention relates to a composition. In one important aspect this invention relates to a composition consisting essentially of about 0.05–5 moles of at least one strong base selected from the group consisting of alkali metal hydroxides, alkali metal alkoxides, alkali metal phenoxides, and quaternary ammonium hydroxides per liter in a solvent consisting of about 30–100 parts of dimethyl sulfoxide and about 0–70 parts of at least one cosolvent selected from the group consisting of water and alcohols selected from the group consisting of alkanols having 1–5 carbon atoms per molecule, glycols having 2–5 carbon atoms per molecule, and triols having 3–5 carbon atoms per molecule, providing, however that, where the cosolvent is water, the solvent consists of about 70–99 parts of dimethylsulfoxide and about 1–30 parts of water, and providing further that, where the solvent contains less than about 5 parts of cosolvent, the composition is one consisting essentially of about 0.1–3 moles of at least one strong base selected from the group consisting of alkali metal alkoxides, alkali metal phenoxides, and quaternary ammonium hydroxides per liter in a solvent consisting of about 96–100 parts of dimethyl sulfoxide and about 0–4 parts of at least one cosolvent selected from the group consisting of water, and alcohols selected from the group consisting of alkanols having 1–5 carbon atoms per molecule, glycols having 2–5 carbon atoms per molecule and triols having 3–5 carbon atoms per molecule. In still another important aspect this invention relates to the use of the above-described composition to decontaminate surfaces and materials which have been contaminated with toxic agents selected from the group consisting of mustard gas, nitrogen mustard gases, nerve gases, and organic phosphorus insecticides.

It is an object of this invention to provide an effective composition for use in decontaminating surfaces and materials which have been contaminated with toxic substances selected from the group consisting of mustard gas, nitrogen mustard gases, nerve gases, and organic phosphorus insecticides. Another object of this invention is to provide a process for decontaminating materials and surfaces, including the skin surfaces and clothing of human beings and the skin surfaces of animals, which have been contaminated with any of the aforesaid toxic substances. Other objects of this invention will be readily apparent to those skilled in the art.

This invention resulted from the need for an effective decontaminating material which can be employed against persistent chemical warfare agents, including mustard gas, nitrogen mustard gases, and nerve gases. Prior art methods for decontaminating these chemical warfare agents included the use of chlorinating agents such as bleach, sodium hypochlorite, and solutions of 1,3-dichloro-5,5-dimethylhydantoin dissolved in chlorinated hydrocarbons, and, in the case of GF agents, aqueous solutions of alkali metal hydroxides. Since these classical decontaminating reagents were themselves toxic, or corrosive, or both, it was necessary to flush them from the surfaces to which they had been decontaminating agents.

Also, the prior art methods of decontamination were not well suited for application to the skin of humans or animals who had come into contact with chemical warfare agents. Further, the decontaminating compositions which were used in the prior art were usually unstable, and those compositions containing chlorinated hydrocarbon solvents were difficult to flush from decontaminated surfaces or ares with water.

I have found that the composition of my invention is substantially non-toxic and only mildly corrosive. Thus, it is not generally necessary to flush surfaces of metals, wood, textiles, and the like to prevent the decontaminating solution from attacking said surfaces. However, for convenience, it is often desirable that the decontaminated surfaces be flushed to remove the resulting mixture of chemicals which would be unsightly in military bases and other populated areas and which, if left on the ground or on road surfaces, could tend to make said surfaces slippery. Also, some metal surfaces such as aluminum or zinc can be attacked, under certain conditions, by excessive quantities of the decontaminating agent of my invention. Accordingly, it is frequently desirable to flush surfaces that have been decontaminated with the composition of my invention. Also, if a surface of the skin on a human or an animal is decontaminated with the reagent of my invention, it is good practice to flush excess decontaminating agent from said skin after the human or animal has been thoroughly decontaminated. However, if this is not done the result will be irritation and inconvenience rather than incapacitation.

I have found that the composition of my invention is most effective for decontaminating mustard gas, the so-called "nitrogen mustard gases" (e.g., $N(CH_2CH_2Cl)_3$, tris(2-chloroethyl)amine; $RN(CH_2CH_2Cl)_2$, alkyl substituted bis(2-chloroethyl)amines, wherein "R" is an alkyl group; and the like), nerve gases (e.g., the so-called "GF," cyclohexyl methylphosphonofluoridate; "VX," O-ethyl S-[2 - diisopropylaminoethyl]methylphosphonothiolate; and the like), and organic phosphorus insecticides (e.g., "Parathion," diethyl (p-nitrophenyl) phosphorothionate; "methyl parathion," dimethyl (p-nitrophenyl) phosphorothionate; and the like). The organophosphorus poisons (toxic organic phosphorus compounds) constitute a well known group of compunds. Members of this group which are extremely toxic to higher animals (including man) constitute the well known deadly nerve gases. Members of said group which are somewhat less toxic to higher animals but which are very toxic to insects constitute the well known organic phosphorus insecticides. Members of said group which are of considerably lower toxicity to higher animals have been used as medicine (e.g., in the control of grubs in cattle).

The term "insect," as used herein, includes not only the members of the class Insecta, but also related or similar non-vertebrate animal organisms belonging to the allied classes of arthropods and including mites, ticks, spiders, wood lice, and the like. The term "insecticides," as used herein, includes materials which are toxic to "insects" as defined supra.

I have found that the composition of my invention is an excellent material for decontaminating surfaces and materials contaminated with any of the toxic organic phosphorus group of compounds (organophosphorus poisons) including nerve gases, organic phosphorus insecticides, and those members of said group whose toxicity is sufficiently low to permit the use of said members as medicine or medicinal agents.

The composition of my invention is best used by applying an excess of said composition to a contaminated material or to a contaminated surface and allowing the thus treated material or surface to remain in intimate contact with said composition for a period of time—normally at least about 5 minutes and usually not longer than 15–20 minutes. However, in some instances (e.g., heavily contaminated porous surfaces) it may be desirable to allow the treated surfaces to remain in contact with said composition for an hour or even longer. However, if said surface is the skin of a human or the skin of an animal, I prefer to wash said skin with excess water, usually about 5–15 minutes after said composition has been applied. If necessary, a second application of said composition can be made to the contaminated skin surface. Obviously, if a human's clothing has been contaminated, such clothing should be removed promptly (preferably after applying the composition of my invention to the contaminated areas of the clothing). Subsequent to removing the contaminated clothing, the body surface of said human should be inspected, and any contaminated areas should be treated with the composition of my invention.

I have found that benzyl trimethylammonium hydroxide, tetramethylammonium hydroxide, and tetrapropylammonium hydroxide are of special value as strong bases in the composition of my invention.

I have found that dimethyl sulfoxide is an essential ingredient of the composition of my invention. Attempts to decontaminate mustard gas, nitrogen mustard gases, and nerve gases with solutions of strong bases in water or alcohols or in mixtures thereof have always given results far inferior to those obtained with the compositions of my invention. Without dimethyl sulfoxide, decontamination was always incomplete after several hours, and the actual rate of decontamination was much slower in the absence of dimethyl sulfoxide.

An especially useful composition is one consisting essentially of about 0.1–0.3 mole of strong base selected from the group consisting of alkali metal hydroxides, alkali metal alkoxides, alkali metal phenoxides, and quaternary ammonium hydroxides per liter in a solvent consisting of about 70–95 parts of dimethyl sulfoxide and about 5–30 parts of a cosolvent selected from the group consisting of water and alcohols selected from the group consisting of alkanols having 1–5 carbon atoms per molecule, glycols selected from the group consisting of glycols having 2–5 carbon atoms per molecule, and triols selected from the group consisting of triols having 3–5 carbon atoms per molecule.

Another especially useful composition is one consisting essentially of about 0.5 mole of sodium hydroxide per liter in a solvent consisting of about 70 parts of dimethyl sulfoxide and about 30 parts of water. This composition has a low freezing point (ca. $-45°$ C.). It can be used to decontaminate surfaces at temperttures of $-40$ to $-45°$ C. or even lower.

A preferred composition is one consisting essentially of about 0.5–1 mole of potassium or sodium alkoxide per liter in a solvent consisting of about 60–80 parts of dimethyl sulfoxide and 20–40 parts of methyl alcohol.

I have found that potassium and sodium t-butoxide and sodium methoxide are especially useful alkoxides and that isopropyl alcohol is an especially useful alcohol for preparing the composition of my invention.

In general I prefer to determine mustard gas and nitrogen mustard gases by a standard colorimetric procedure based upon the reaction of the mustard gas or nitrogen mustard gases with 4-(4-nitrobenzyl)-pyridine. I generally prefer to determine "GF" by a conventional method based upon the Schoenemann reaction and "VX" by a modification of said reaction.

As used in the specification and claims of this application: (a) the term "alcohols" means saturated alkanols, saturated glycols, and saturated triols; (b) the term "glycols" means saturated alcohols having two hydroxyl groups per molecule with each hydroxyl group attached to a separate carbon atom; (c) the term "triols" means saturated alcohols having three hydroxyl groups per molecule with each hydroxyl group attached to a separate carbon atom; (d) the term "parts," unless specified otherwise where used, means parts by weight; (e) the term "alkali metal" means lithium, sodium, and potassium; and (f) the term "alkoxides" includes compounds having the formula MOR where "M" is an alkali metal as defined above, "O" is oxygen, and "R" is an alkyl or cycloalkyl radical having from 1 to about 8 carbon atoms.

With the exception of Example I (which was made at the temperature of a worker's arm) all runs reported in the examples of this specification were made at ambient temperature (i.e., ca. 20–25° C.) unless stated otherwise where reported. However, this temperature range is not limiting, and other runs have been made at higher and lower temperatures.

The invention of this application will be better understood by referring to the following specific but nonlimiting examples.

EXAMPLE I

About 0.3 g. of mustard gas was spilled on the arm of a laboratory worker. Within about 5–10 seconds after the spillage occurred, I treated the thus contaminated area with about 25–30 g. of a composition consisting essentially of about 10 g. of sodium hydroxide per liter in a solvent consisting of 90 parts dimethyl sulfoxide and 10 parts water. After about 5 minutes, I flushed the decontaminating solution from the worker's arm with water, and I examined the thus flushed arm. The thus treated tissue was not red, and it gave no evidence of having been attacked by mustard gas. The thus treated arm was inspected twice daily for a period of about 2 weeks. At each inspection, said arm was completely free of all evidence of having been contacted by mustard gas.

EXAMPLE II

In this run, $4 \times 10^{-3}$ mole of "GF" was added to 50 ml. of a solution consisting essentially of about 0.32 mole of sodium hydroxide per liter in a solvent consisting of 88 parts of dimethyl sulfoxide and 12 parts of water at a temperature of about 25° C. After 2.5 minutes, more than 99.9% of the "GF" had been completely inactivated.

EXAMPLE III

In this run, $7 \times 10^{-4}$ mole of "VX" was added to 50 ml. of a solution consisting essentially of 0.15 mole of sodium hydroxide in a liter of a solution consisting of 90 parts of dimethyl sulfoxide and 10 parts of water at a temperature of 25° C. After 4 minutes, the "VX" was completely decomposed.

EXAMPLE IV

In this run, $6 \times 10^{-3}$ mole of "VX" was added to 50 ml. of a solution consisting essentially of about 0.41 mole of potassium t-butoxide in a liter of a solvent consisting of about 91 parts dimethyl sulfoxide and 9 parts of t-butyl alcohol at about 25° C. In about 5 minutes time, about 61% of the "VX" had been decomposed.

EXAMPLE V

In this run, $6 \times 10^{-3}$ mole of "VX" was added to 50 ml. of a solution consisting essentially of about 0.42 mole of sodium methoxide per liter of solvent consisting of 91 parts dimethyl sulfoxide and 9 parts of methyl alcohol at about 25° C. In about 5 minutes, more than 67% of the "VX" had been decomposed.

EXAMPLE VI

In this run, $7 \times 10^{-3}$ mole of "VX" was added to 50 ml. of a solution consisting essentially of about 0.48 mole of benzyl trimethylammonium hydroxide in a liter of a solution consisting of 93.5 parts of dimethyl sulfoxide and 6.5 parts of methyl alcohol at 25° C. In about 5 minutes, 77% of the "VX" had been decomposed.

EXAMPLE VII

In this run, $1 \times 10^{-3}$ mole of mustard gas was added to 21 ml. of a solution consisting essentially of about 0.1 mole of sodium hydroxide per liter of a solvent consisting of about 46 parts of ethyl alcohol and about 54 parts of water. Less than about 70% of the mustard gas had been decomposed at the end of about 2.5 hours.

EXAMPLE VIII

In this run, $1 \times 10^{-3}$ mole of mustard gas was added to 20 ml. of a solution consisting essentially of about 0.1 mole of sodium hydroxide per liter in a solvent consisting of about 89% dimethyl sulfoxide and 11% of water at 25° C. Decomposition of the mustard gas was 61% complete in about 20 minutes.

EXAMPLE IX

In this run, $9 \times 10^{-3}$ mole of mustard gas was added to 20 ml. of a solution consisting essentially of about 1.0 mole of sodium methoxide per liter in a solvent consisting of about 53 parts of dimethyl sulfoxide and about 47 37 parts of t-butyl alcohol at 25° C. About 74% of the mustard gas had been decomposed after about 3.5 minutes.

EXAMPLE X

In this run, $9 \times 10^{-4}$ mole of mustard gas was added to 20 ml. of a solution consisting essentially of about 1.0 mole of sodium methoxide per liter in a solvent consisting of aobut 53 parts of dimethyl sulfoxide and about 47 parts of t-butyl alcohol at 25° C. About 67% of the mustard gas had been decomposed after about 4.7 minutes.

EXAMPLE XI

In this run, 0.02 mole of mustard gas was added to 20 ml. of a solution consisting essentially of about 2.0 mole of potassium t-butoxide per liter in a solvent consisting of about 34 parts of dimethyl sulfoxide and about 66 parts of t-butyl alcohol at 25° C. About 83% of the mustard gas had been decomposed in about 4 minutes.

EXAMPLE XII

In this run, about $9 \times 10^{-3}$ mole of mustard gas was added to 20 ml. of a solution consisting essentially of about 1.0 mole of benzyl trimethylammonium hydroxide per liter in a solution consisting of about 50.7 parts of dimethyl sulfoxide and about 49.3 parts of t-alcohol at 25° C. At least about 95% of the mustard gas decomposed in about 1.4 minutes.

EXAMPLE XIII

In this run, $1 \times 10^{-3}$ mole of mustard gas was added to 20 ml. of a solution consisting essentially of about 0.26 mole of sodium p-methoxyphenoxide per liter in dimethyl sulfoxide at 25° C. After 11 minutes about 83% of the mustard gas had decomposed.

EXAMPLE XIV

About 5 g. of mustard gas (undiluted mustard gas) was poured on a steel surface. About 200 ml. of a solution consisting essentially of about 0.5 mole of sodium hydroxide per liter in a solvent consisting of about 75 parts of dimethyl sulfoxide and about 25 parts of water was poured over the mustard gas-contaminated steel surface. At the end of a 20 minute period it was found by conventional analysis (colorimetric determination of mustard gas) that the treated steel surface was substantially free of mustard gas.

EXAMPLE XV

In this run, 0.8 g. of mustard gas was added to 50 ml. of a solution consisting essentially of about 0.3 mole of benzyl trimethylammonium hydroxide per liter in a solvent consisting of dimethyl sulfoxide. The mustard gas was completely decomposed in less than 6 minutes.

Identical results were obtained when the run of this example was repeated but modified by using a solution consisting essentially of 0.3 mole of benzyl trimethylammonium hydroxide per liter in a solvent consisting of about 97 parts dimethyl sulfoxide and about 3 parts of methyl alcohol.

EXAMPLE XVI

In this run, 0.8 g. of mustard gas was added to 50 ml. of a solution consisting essentially of about 0.25 mole of benzyl trimethylammonium hydroxide per liter in a solvent consisting of 90 parts dimethylsulfoxide and 10 parts ethylene glycol. The mustard gas was completely decomposed in less than 5 minutes.

EXAMPLE XVII

In this run, about 1 g. tris(2-chloroethyl)amine, a nitrogen mustard gas, was added to 100 ml. of a solution consisting essentially of about 0.5 mole of sodium methoxide per liter in a solvent consisting of 90 parts dimethyl sulfoxide and 10 parts of methyl alcohol. The nitrogen mustard gas was completely decomposed in less than 3 minutes. (Nitrogen mustard gas was determined by a conventional colorimetric procedure based on the reaction of mustard gas with 4-(4-nitrobenzyl)-pyridine.)

EXAMPLE XVIII

In this run, 0.8 g. of mustard gas was added to 50 ml. of a solution consisting essentially of about 0.25 mole of benzyl trimethylammonium hydroxide per liter in a solvent consisting of 90 parts of dimethyl sulfoxide and 10 parts of glycerol. The mustard gas was completely decomposed in less than 5 minutes.

EXAMPLE XIX

This run was made at about $-10°$ C. About a g. of mustard gas was added to a steel plate. About 300 ml. of a solution consisting essentially of about 0.5 mole of sodium hydroxide per liter in a solvent consisting of about 70 parts of dimethyl sulfoxide and about 30 parts of water was poured over the contaminated area. When tested, at the end of about an hour, the thus treated plate was substantially free of mustard gas.

EXAMPLE XX

In this run, about 1 g. of parathion was placed in a beaker, and 75 ml. of a solution consisting essentially of about 0.1 mole of sodium hydroxide per liter in a solvent consisting of 90 parts of dimethyl sulfoxide and 10 parts water was added to said beaker. The decomposition of the parathion was complete in less than 2 minutes (as shown by the colorimetric determination of p-nitrophenol formed in the decontamination process).

EXAMPLE XXI

In this run, 10 ml. of a solution consisting essentially of about 1 mole of benzyltrimethylammonium hydroxide per liter in dimethyl sulfoxide was added to about 1 g. of Malathion. The Malathion was decomposed in less than 2 minutes.

EXAMPLE XXII

Dimefox,

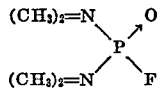

was spilled on a laboratory bench. The spilled material was decontaminated by spraying with an excess of a solution consisting essentially of about 0.25 mole of sodium hydroxide per liter in a solution consisting of 90 parts dimethyl sulfoxide and 10 parts water. After about 2 minutes the decontaminated area was wiped with a paper towel, and the towel was extracted with ethyl acetate. No dimefox was found in the extract which was immediately tested by the Schoenemann reaction.

What is claimed is:

1. A composition consisting essentially of about 0.05–5 moles of at least one strong base selected from the group consisting of alkali metal hydroxides, alkali metal alkoxides, alkali metal phenoxides, and quaternary ammonium hydroxides per liter in a solvent consisting of about 30–100 parts of dimethyl sulfoxide and about 0–70 parts of at least one cosolvent selected from the group consisting of water and alcohols selected from the group consisting of alkanols having 1–5 carbon atoms per molecule, glycols having 2–5 carbon atoms per molecule, and triols having 3–5 carbon atoms per molecule.

2. The composition described in claim 1 in which a cosolvent is employed.

3. The composition described in claim 1 in which the cosolvent is water.

4. The composition described in claim 3 in which the cosolvent comprises 1–30 parts of water and the solven comprises about 70–99 parts of dimethyl sulfoxide.

5. The composition of claim 3 in which strong base is sodium hydroxide.

6. A composition consisting essentially of about 0.1–3 moles of at least one strong base selected from the group consisting of alkali metal alkoxides, alkali metal phenoxides, and quaternary ammonium hydroxides per liter in a solvent consisting of about 96–100 parts of dimethyl sulfoxide and less than 5 parts of at least one cosolvent selected from the group consisting of water, and alcohols selected from the group consisting of alkanols having 1–5 carbon atoms per molecule, glycols having 2–5 carbon atoms per molecule and triols having 3–5 carbon atoms per molecule.

7. A composition consisting essentially of about 0.1–0.5 mole per liter of a strong base selected from the group consisting of alkali metal hydroxides, alkali metal alkoxides, alkali metal phenoxides, and quaternary ammonium hydroxides in a solvent consisting of about 70–95 parts of dimethyl sulfoxide and about 5–30 parts of at least one cosolvent selected from the group consisting of water and alcohols selected from the group consisting of alkanols having 1–5 carbon atoms per molecule, glycols selected from the group consisting of 2–5 carbon atoms per molecule, and triols selected from the group consisting of triols having 3–5 carbon atoms per molecule.

8. A composition consisting essentially of 0.5–1 mole of sodium methoxide per liter in a solvent.

9. A composition consisting essentially of 0.1–0.3 mole of sodium hydroxide per liter in a solvent consisting of about 90 parts of dimethyl sulfoxide and about 10 parts of water.

10. A composition consisting essentially of 0.5 mole of sodium hydroxide per liter in a solvent consisting of about 70 parts of dimethyl sulfoxide and about 30 parts of water.

References Cited

UNITED STATES PATENTS

| | | | |
|---|---|---|---|
| 3,068,142 | 12/1962 | Bader et al. | 252—364 X |
| 3,351,560 | 11/1967 | Brown et al. | 252—364 X |

STEPHEN J. LECHERT, JR., Primary Examiner

U.S. Cl. X.R.

252—158, 170, 171, 364, Dig. 5